US011539957B2

(12) United States Patent
Choi et al.

(10) Patent No.: US 11,539,957 B2
(45) Date of Patent: Dec. 27, 2022

(54) LAYERED RANDOM ACCESS WITH REFERENCE PICTURE RESAMPLING

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 37 days.

(21) Appl. No.: 16/902,972

(22) Filed: Jun. 16, 2020

(65) Prior Publication Data

US 2020/0404280 A1  Dec. 24, 2020

Related U.S. Application Data

(60) Provisional application No. 62/864,480, filed on Jun. 20, 2019.

(51) Int. Cl.
*H04N 19/132* (2014.01)
*H04N 19/34* (2014.01)

(52) U.S. Cl.
CPC .......... *H04N 19/132* (2014.11); *H04N 19/34* (2014.11)

(58) Field of Classification Search
CPC ...... H04N 19/61; H04N 19/187; H04N 19/30; H04N 19/34; H04N 19/107; H04N 19/597
See application file for complete search history.

(56) References Cited

U.S. PATENT DOCUMENTS

| 2009/0220008 A1* | 9/2009 | Park | H04N 19/187 |
| | | | 375/240.24 |
| 2011/0110418 A1* | 5/2011 | Lu | H04N 19/68 |
| | | | 375/240.02 |
| 2011/0134994 A1* | 6/2011 | Lu | H04N 21/6437 |
| | | | 375/240.02 |

(Continued)

OTHER PUBLICATIONS

Chen et al., AHG 19: Adaptive Resolution Change, Joint Video Experts Team Document, JVET-N0279, Geneva, Mar. 2019 (Year: 2019).*

(Continued)

*Primary Examiner* — Daniel Chang
(74) *Attorney, Agent, or Firm* — Sughrue Mion, PLLC

(57) ABSTRACT

A method of decoding an encoded video bitstream using at least one processor, including obtaining a coded base layer picture and a coded enhancement layer picture included in an LRA access unit; determining whether a random access occurs at the LRA access unit; based on the random access not occurring at the LRA access unit, generating a reconstructed base layer picture by reconstructing the coded base layer picture, and generating a reconstructed enhancement layer picture by reconstructing the coded enhancement layer picture using the reconstructed base layer picture and a previously reconstructed picture; based on the random access occurring at the LRA access unit, generating the reconstructed base layer picture by reconstructing the coded base layer picture, and generating the reconstructed enhancement layer picture by upsampling the reconstructed base layer picture; and outputting the reconstructed enhancement layer picture.

19 Claims, 10 Drawing Sheets

(56) References Cited

U.S. PATENT DOCUMENTS

| | | | | |
|---|---|---|---|---|
| 2011/0310973 A1* | 12/2011 | Cheon | ............... | H04N 19/18 |
| | | | | 375/240.18 |
| 2013/0163660 A1* | 6/2013 | Boyce | ............... | H04N 19/46 |
| | | | | 375/240.02 |
| 2013/0294500 A1* | 11/2013 | Wang | ............... | H04N 19/70 |
| | | | | 375/240.02 |
| 2014/0301436 A1* | 10/2014 | Wang | ............... | H04N 19/172 |
| | | | | 375/240.02 |
| 2014/0301463 A1* | 10/2014 | Rusanovskyy | ........ | H04N 19/39 |
| | | | | 375/240.14 |
| 2014/0301485 A1* | 10/2014 | Ramasubramonian | ............... | |
| | | | | H04N 19/70 |
| | | | | 375/240.27 |
| 2015/0063463 A1* | 3/2015 | Choi | ............... | H04N 19/70 |
| | | | | 375/240.25 |
| 2015/0103900 A1* | 4/2015 | Liu | ............... | H04N 19/14 |
| | | | | 375/240.12 |
| 2015/0103923 A1* | 4/2015 | Ramasubramonian | ............... | |
| | | | | H04N 19/46 |
| | | | | 375/240.26 |
| 2015/0103927 A1* | 4/2015 | Hannuksela | ............... | H04N 19/159 |
| | | | | 375/240.26 |
| 2015/0103928 A1* | 4/2015 | Seregin | ............... | H04N 19/70 |
| | | | | 375/240.26 |
| 2015/0117514 A1* | 4/2015 | Choi | ............... | H04N 19/597 |
| | | | | 375/240.01 |
| 2015/0156501 A1* | 6/2015 | Hannuksela | ............... | H04N 19/70 |
| | | | | 375/240.12 |
| 2015/0195577 A1* | 7/2015 | Hannuksela | ............... | H04N 19/44 |
| | | | | 375/240.25 |
| 2015/0261884 A1* | 9/2015 | Pang | ............... | G06F 16/9024 |
| | | | | 707/741 |
| 2015/0304665 A1* | 10/2015 | Hannuksela | ............... | H04N 13/161 |
| | | | | 375/240.02 |
| 2015/0312580 A1* | 10/2015 | Hannuksela | ............... | H04N 19/31 |
| | | | | 375/240.02 |
| 2015/0373345 A1* | 12/2015 | Ramasubramonian | ............... | |
| | | | | H04N 19/105 |
| | | | | 375/240.26 |
| 2016/0044309 A1* | 2/2016 | Choi | ............... | H04N 19/61 |
| | | | | 375/240.12 |
| 2016/0080747 A1* | 3/2016 | Choi | ............... | H04N 19/46 |
| | | | | 375/240.12 |
| 2016/0088306 A1* | 3/2016 | Sjoberg | ............... | H04N 19/44 |
| | | | | 375/240.02 |
| 2016/0219301 A1* | 7/2016 | Pettersson | ............... | H04N 19/176 |
| 2016/0330459 A1* | 11/2016 | Choi | ............... | H04N 19/187 |
| 2016/0337657 A1* | 11/2016 | Choi | ............... | H04N 19/70 |
| 2017/0054993 A1* | 2/2017 | Yang | ............... | H04N 19/114 |
| 2020/0396445 A1* | 12/2020 | Seregin | ............... | H04N 19/105 |

OTHER PUBLICATIONS

"High efficiency video coding", Series H: Audiovisual and Multimedia Systems; Infrastructure of audiovisual services—Coding of moving video; ITU-T. H.265, Feb. 2018, 692 pages.

\* cited by examiner

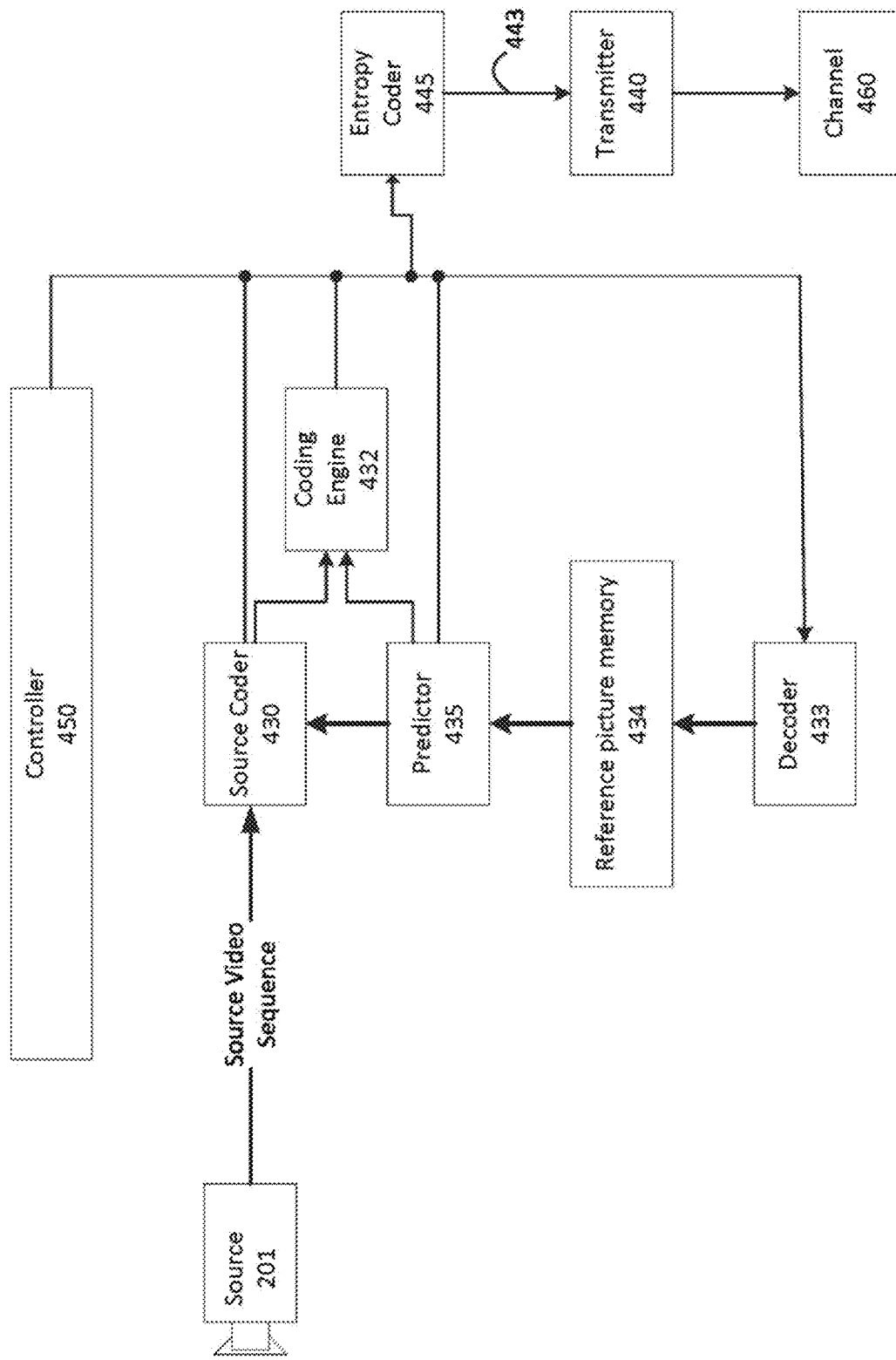

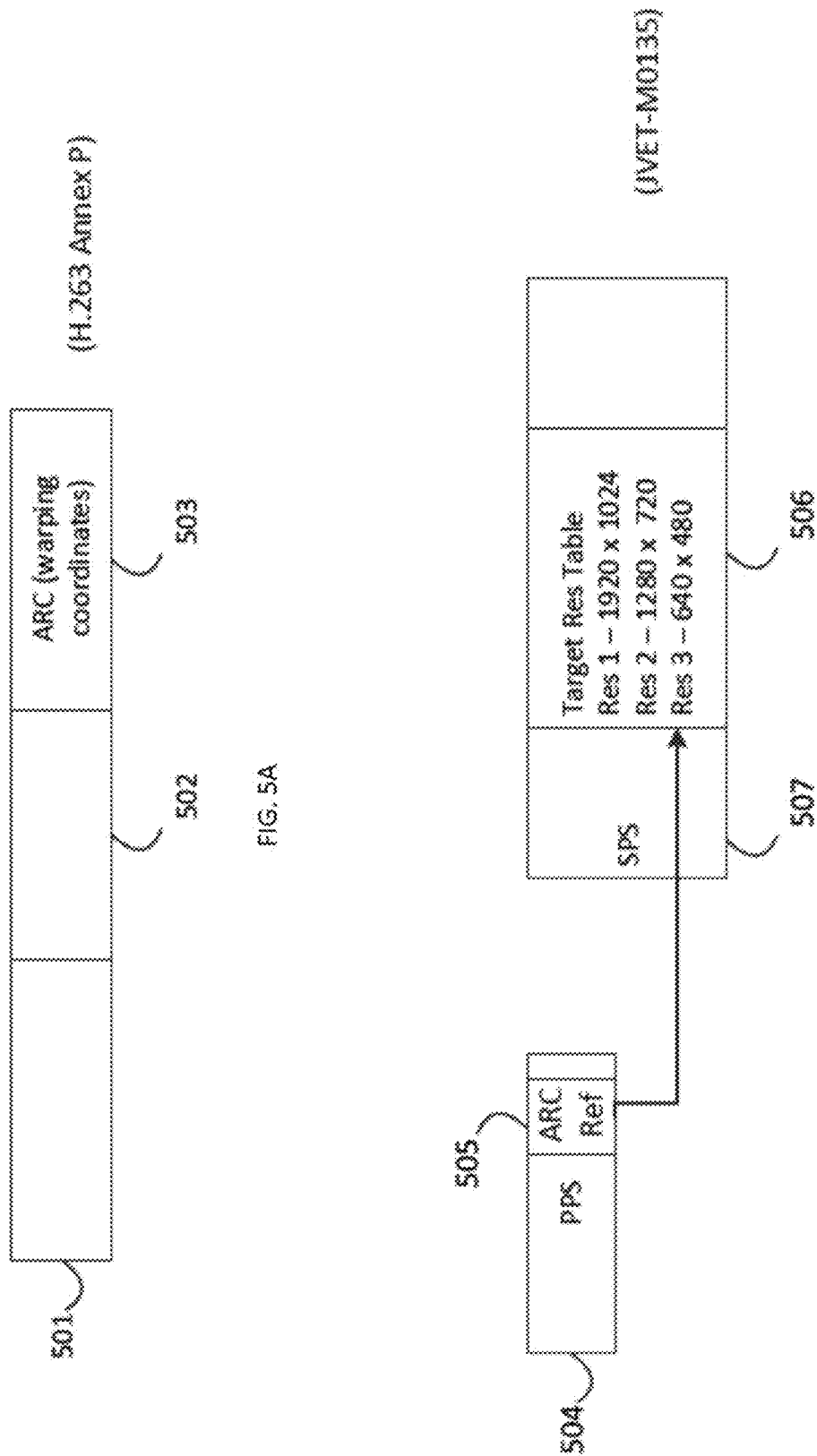

|  |  | |
|---|---|---|
| tile_group_header() { | | |
| ... | | |
| if(adaptive_pic_resolution_change_flag) { | | |
| dec_pic_size_idx | | u(3) |
| } | | |
| ... | | |
| } | | |

601 — tile_group_header()
603 — if(adaptive_pic_resolution_change_flag)
602 — dec_pic_size_idx

FIG. 6A

| | Descriptor |
|---|---|
| seq_parameters_set_rbsp() { | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| } | |
| ... | |
| } | |

610 — seq_parameters_set_rbsp()
611 — adaptive_pic_resolution_change_flag
612 — if(adaptive_pic_resolution_change_flag)
613 — output_pic_width_in_luma_samples / output_pic_height_in_luma_samples
614 — reference_pic_size_present_flag
615 — reference_pic_width/height_in_luma_samples
616 — num_dec_pic_size_in_luma_samples_minus1
617 — dec_pic_width/height_in_luma_samples[ i ]

FIG. 6B

LAYERED RANDOM ACCESS WITH REFERENCE PICTURE RESAMPLING

CROSS-REFERENCE TO RELATED APPLICATION

This application claims priority from 35 U.S.C. § 119 to U.S. Provisional Application No. 62/864,480, filed on Jun. 20, 2019, in the United States Patent & Trademark Office, the disclosure of which is incorporated herein by reference in its entirety.

FIELD

The disclosed subject matter relates to video coding and decoding, and more specifically, to the signaling of random access point with layered structure based on adaptive resolution change and reference picture resampling.

BACKGROUND

Video coding and decoding using inter-picture prediction with motion compensation has been known. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture timeframe. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document WET-M0135-v1, Jan. 9-19, 2019, incorporated herein in its entirety) allow for resampling of whole reference pictures to different—higher or lower—resolutions. In that document, different candidate resolutions are suggested to be coded in the sequence parameter set and referred to by per-picture syntax elements in the picture parameter set.

SUMMARY

In an embodiment, there is provided a method of decoding an encoded video bitstream using at least one processor including obtaining from the encoded video bitstream a coded base layer picture included in a layered random access (LRA) access unit, and a coded enhancement layer picture included in the LRA access unit; determining whether a random access occurs at the LRA access unit; based on the random access not occurring at the LRA access unit, generating a reconstructed base layer picture by reconstructing the coded base layer picture, and generating a reconstructed enhancement layer picture by reconstructing the coded enhancement layer picture using the reconstructed base layer picture and a previously reconstructed picture; based on the random access occurring at the LRA access unit, generating the reconstructed base layer picture by reconstructing the coded base layer picture, and generating the reconstructed enhancement layer picture by upsampling the reconstructed base layer picture; and outputting the reconstructed enhancement layer picture.

In an embodiment, there is provided a device for decoding an encoded video bitstream, the device including: at least one memory configured to store program code; and at least one processor configured to read the program code and operate as instructed by the program code, the program code including: first obtaining code configured to cause the at least one processor to obtain from the encoded video bitstream a coded base layer picture included in a layered random access (LRA) access unit, and a coded enhancement layer picture included in the LRA access unit; determining code configured to cause the at least one processor to determine whether a random access occurs at the LRA access unit; first generating code configured to cause the at least one processor to, based on the random access not occurring at the LRA access unit, generate a reconstructed base layer picture by reconstructing the coded base layer picture, and generate a reconstructed enhancement layer picture by reconstructing the coded enhancement layer picture using the reconstructed base layer picture and a previously reconstructed picture; second generating code configured to cause the at least one processor to, based on the random access occurring at the LRA access unit, generate the reconstructed base layer picture by reconstructing the coded base layer picture, and generate the reconstructed enhancement layer picture by upsampling the reconstructed base layer picture; and output code configured to cause the at least one processor to output the reconstructed enhancement layer picture.

In an embodiment, there is provided a non-transitory computer-readable medium storing instructions, the instructions including: one or more instructions that, when executed by one or more processors of a device for decoding an encoded video bitstream, cause the one or more processors to: obtain from the encoded video bitstream a coded base layer picture included in a layered random access (LRA) access unit, and a coded enhancement layer picture included in the LRA access unit; determine whether a random access occurs at the LRA access unit; based on the random access not occurring at the LRA access unit, generate a reconstructed base layer picture by reconstructing the coded base layer picture, and generate a reconstructed enhancement layer picture by reconstructing the coded enhancement layer picture using the reconstructed base layer picture and a previously reconstructed picture; based on the random access occurring at the LRA access unit, generate the reconstructed base layer picture by reconstructing the coded base layer picture, and generate the reconstructed enhancement layer picture by upsampling the reconstructed base layer picture; and output the reconstructed enhancement layer picture.

BRIEF DESCRIPTION OF THE DRAWINGS

Further features, the nature, and various advantages of the disclosed subject matter will be more apparent from the following detailed description and the accompanying drawings in which:

FIG. 4 is a schematic illustration of a simplified block diagram of an encoder in accordance with an embodiment.

FIGS. 5A-5E are schematic illustrations of options for signaling ARC parameters in accordance with an embodiment, in accordance with an embodiment.

FIGS. 6A-6B are schematic illustration of examples of syntax tables in accordance with an embodiment.

DETAILED DESCRIPTION

Figure 1:
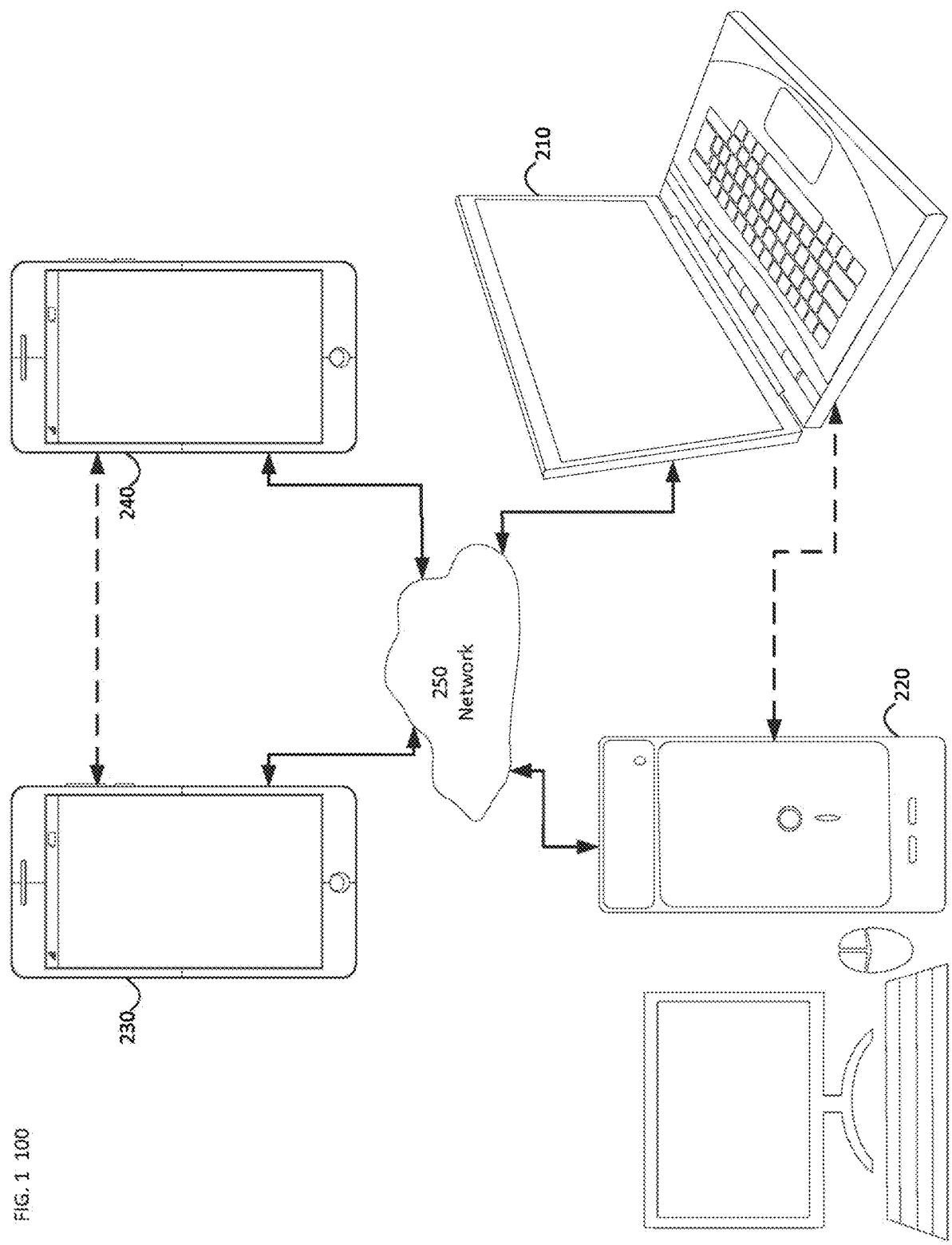
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
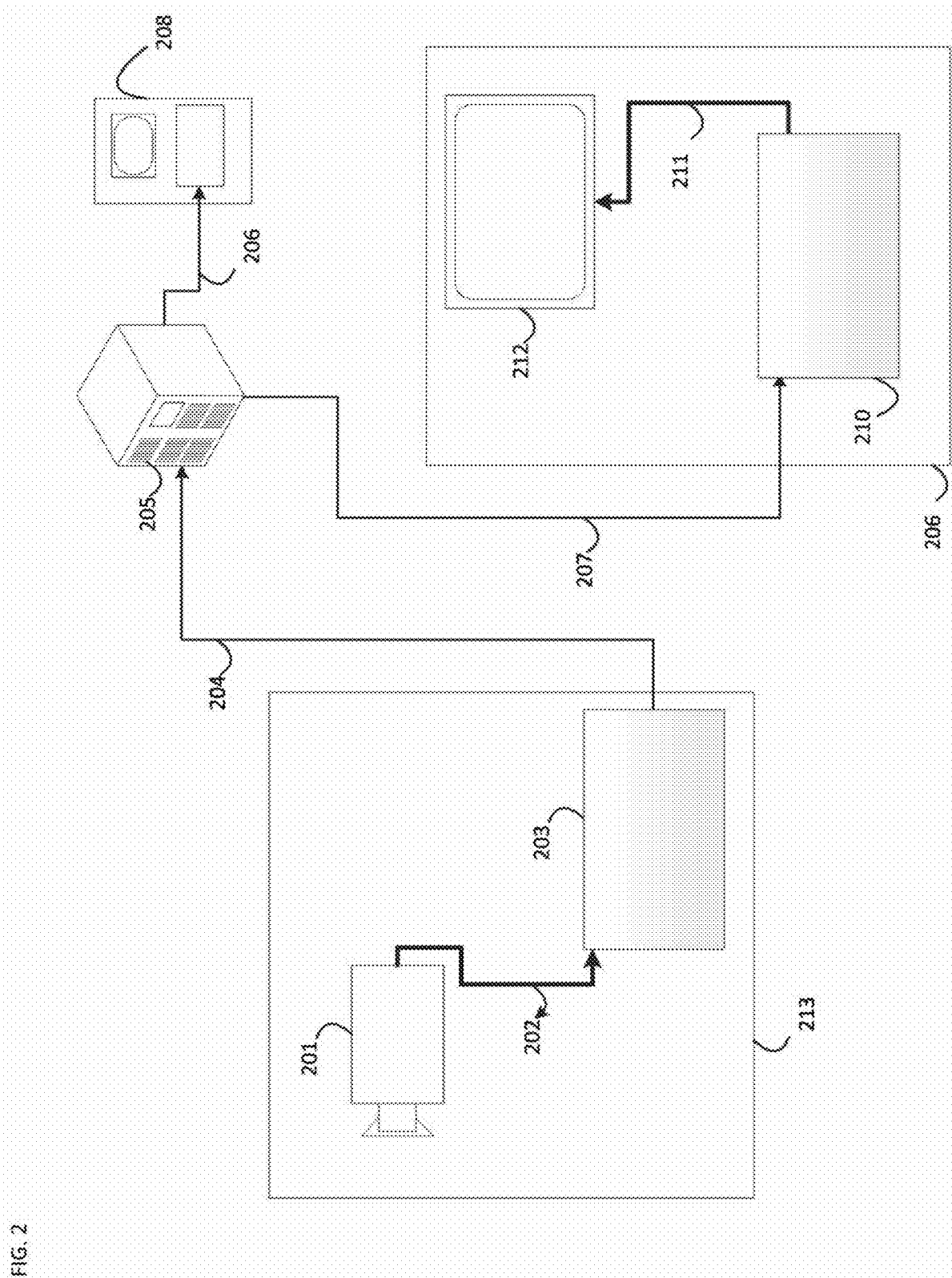
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
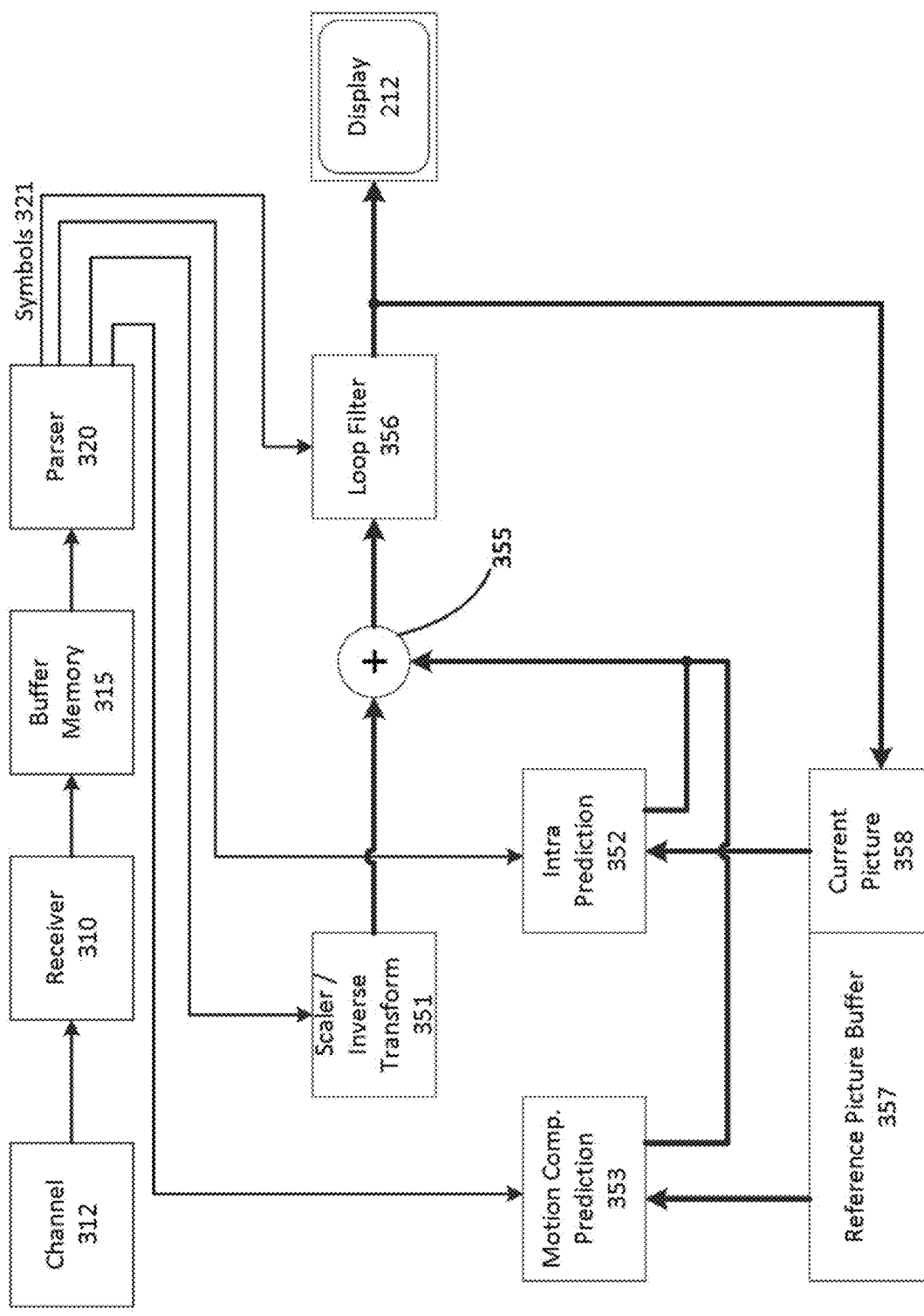
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Recently, compressed domain aggregation or extraction of multiple semantically independent picture parts into a single video picture has gained some attention. In particular, in the context of, for example, 360 coding or certain surveillance applications, multiple semantically independent source pictures (for examples the six cube surface of a cube-projected 360 scene, or individual camera inputs in case of a multi-camera surveillance setup) may require separate adaptive resolution settings to cope with different per-scene activity at a given point in time. In other words, encoders, at a given point in time, may choose to use different resampling factors for different semantically independent pictures that make up the whole 360 or surveillance scene. When combined into a single picture, that, in turn, requires that reference picture resampling is performed, and adaptive resolution coding signaling is available, for parts of a coded picture.

Below, a few terms will be introduced that will be referred to in the remainder of this description.

Sub-Picture may refer to a, in some cases, rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or other cases, one or more coded sub-pictures may be extracted from a coded picture in the compressed domain.

Adaptive Resolution Change (ARC) may refer to mechanisms that allow the change of resolution of a picture or sub-picture within a coded video sequence, by the means of, for example, reference picture resampling. ARC parameters henceforth refer to the control information required to perform adaptive resolution change, that may include, for example, filter parameters, scaling factors, resolutions of output and/or reference pictures, various control flags, and so forth.

In embodiments coding and decoding may be performed on a single, semantically independent coded video picture. Before describing the implication of coding/decoding of multiple sub pictures with independent ARC parameters and its implied additional complexity, options for signaling ARC parameters shall be described.

Referring to FIGS. 5A-5E, shown are several embodiments for signaling ARC parameters. As noted with each of the embodiments, they may have certain advantages and certain disadvantages from a coding efficiency, complexity, and architecture viewpoint. A video coding standard or technology may choose one or more of these embodiments, or options known from related art, for signaling ARC parameters. The embodiments may not be mutually exclusive, and conceivably may be interchanged based on application needs, standards technology involved, or encoder's choice.

Classes of ARC parameters may include:
up/downsample factors, separate or combined in X and Y dimension
up/downsample factors, with an addition of a temporal dimension, indicating constant speed zoom in/out for a given number of pictures
Either of the above two may involve the coding of one or more presumably short syntax elements that may point into a table containing the factor(s).
resolution, in X or Y dimension, in units of samples, blocks, macroblocks, coding units (CUs), or any other suitable granularity, of the input picture, output picture, reference picture, coded picture, combined or separately. If there is more than one resolution (such as, for example, one for input picture, one for reference picture) then, in certain cases, one set of values may be inferred to from another set of values. Such could be gated, for example, by the use of flags. For a more detailed example, see below.
"warping" coordinates akin those used in H.263 Annex P, again in a suitable granularity as described above. H.263 Annex P defines one efficient way to code such warping coordinates, but other, potentially more efficient ways could conceivably also be devised. For example, the variable length reversible, "Huffman"-style coding of warping coordinates of Annex P could be replaced by a suitable length binary coding, where the length of the binary code word could, for example, be derived from a maximum picture size, possibly multiplied by a certain factor and offset by a certain value, so to allow for "warping" outside of the maximum picture size's boundaries.
up or downsample filter parameters. In embodiments, there may be only a single filter for up and/or downsampling. However, in embodiments, it can be desirable to allow more flexibility in filter design, and that may require to signaling of filter parameters. Such parameters may be selected through an index in a list of possible filter designs, the filter may be fully specified (for example through a list of filter coefficients, using suitable entropy coding techniques), the filter may be implicitly selected through up/downsample ratios according which in turn are signaled according to any of the mechanisms mentioned above, and so forth.

Henceforth, the description assumes the coding of a finite set of up/downsample factors (the same factor to be used in both X and Y dimension), indicated through a codeword. That codeword may be variable length coded, for example using the Ext-Golomb code common for certain syntax elements in video coding specifications such as H.264 and H.265. One suitable mapping of values to up/downsample factors can, for example, be according to Table 1:

TABLE 1

| Codeword | Ext-Golomb Code | Original/Target resolution |
| --- | --- | --- |
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes, for example using binary coding. That may have certain advantages when the resampling factors were of interest outside the video processing engines (encoder and decoder foremost) themselves, for example by MANEs. It should be noted that, for situations where no resolution change is required, an Ext-Golomb code can be chosen that is short; in the table above, only a single bit. That can have a coding efficiency advantage over using binary codes for the most common case.

The number of entries in the table, as well as their semantics, may be fully or partially configurable. For example, the basic outline of the table may be conveyed in a "high" parameter set such as a sequence or decoder parameter set. In embodiments, one or more such tables may be defined in a video coding technology or standard, and may be selected through for example a decoder or sequence parameter set.

Below is described how an upsample/downsample factor (ARC information), coded as described above, may be included in a video coding technology or standard syntax. Similar considerations may apply to one, or a few, codewords controlling up/downsample filters. See below for a discussion when comparatively large amounts of data are required for a filter or other data structures.

As shown in FIG. 5A, H.263 Annex P includes the ARC information (502) in the form of four warping coordinates into the picture header (501), specifically in the H.263 PLUSPTYPE (503) header extension. This can be a sensible design choice when a) there is a picture header available, and b) frequent changes of the ARC information are expected. However, the overhead when using H.263-style signaling can be quite high, and scaling factors may not pertain among picture boundaries as picture header can be of transient nature.

As shown in FIG. 5B, JVCET-M135-v1 includes the ARC reference information (505) (an index) located in a picture parameter set (504), indexing a table (506) including target resolutions that in turn is located inside a sequence parameter set (507). The placement of the possible resolution in a table (506) in the sequence parameter set (507) can, according to verbal statements made by the authors, be justified by using the SPS as an interoperability negotiation point during capability exchange. Resolution can change, within the limits set by the values in the table (506) from picture to picture by referencing the appropriate picture parameter set (504).

Figure 5C:
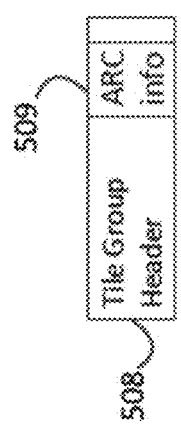
Figure 5D:
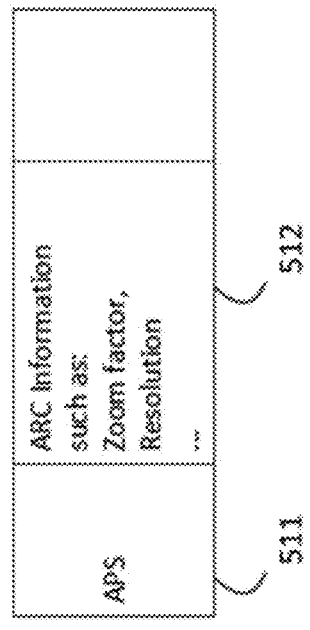
Figure 5E:
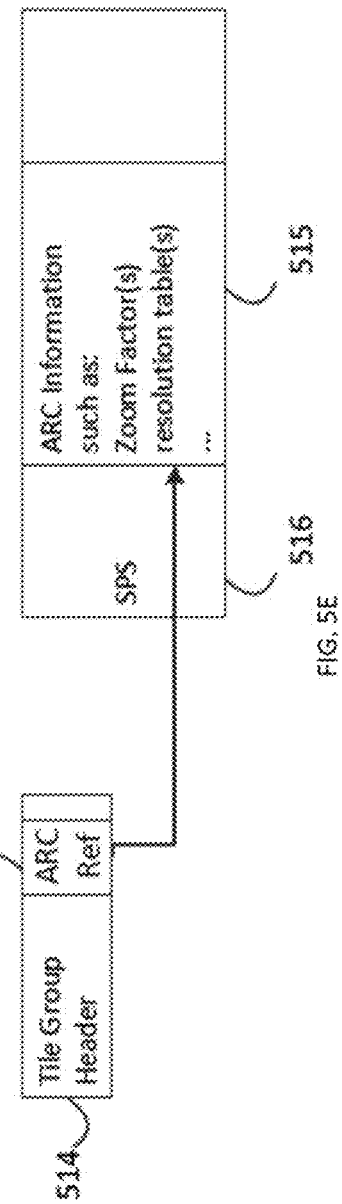
Figure 7:
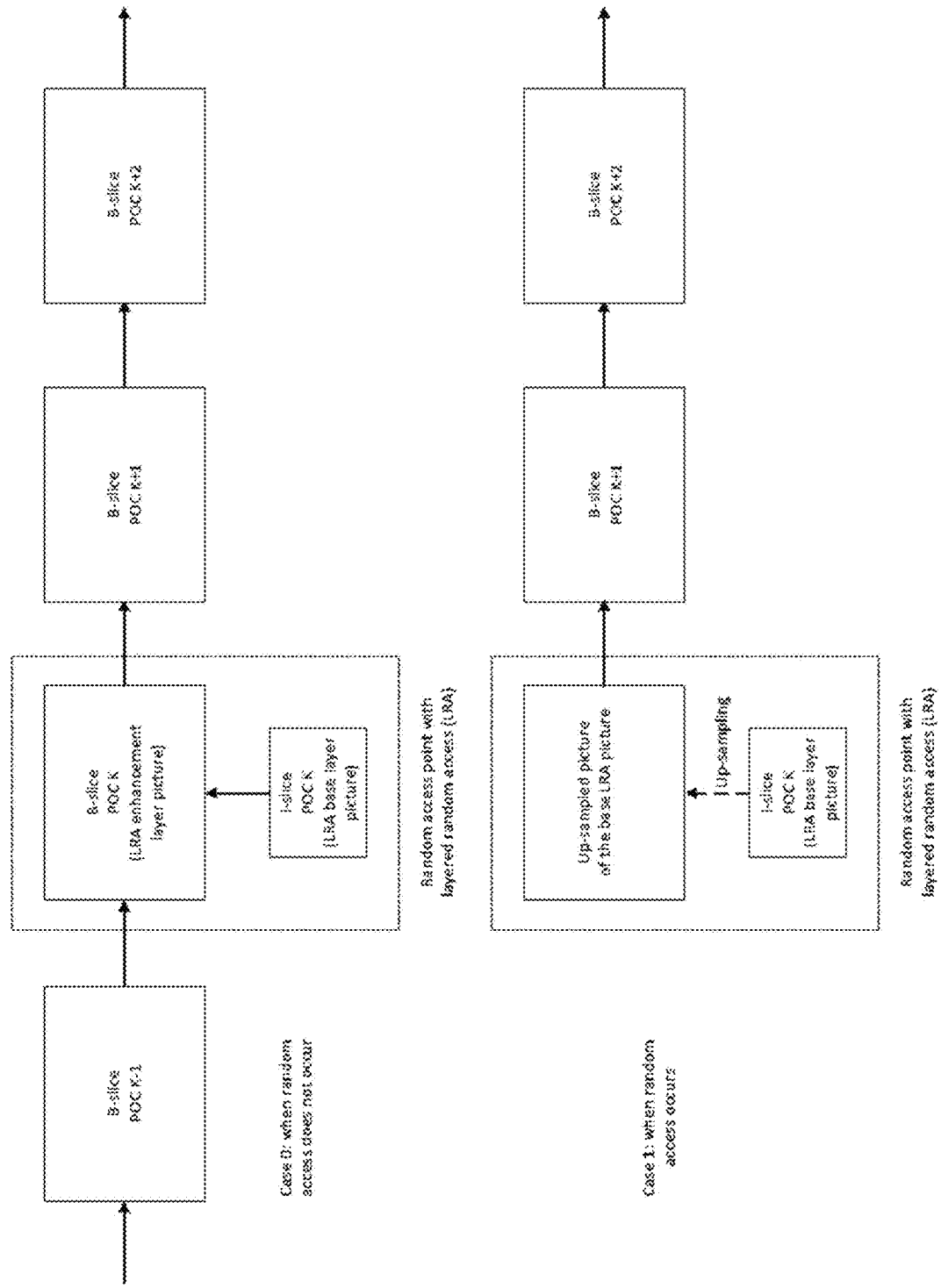
FIG. 7 is a schematic illustration of an example of a prediction structure of layered random access with reference picture resampling in accordance with an embodiment

Referring to FIGS. 5C-5E, the following embodiments may exist to convey ARC information in a video bitstream. Each of those options has certain advantages over embodiments described above. Embodiments may be simultaneously present in the same video coding technology or standard.

In embodiments, for example the embodiment shown in FIG. 5C, ARC information (509) such as a resampling (zoom) factor may be present in a slice header, GOP header, tile header, or tile group header. FIG. 5C illustrates an embodiment in which tile group header (508) is used. This can be adequate if the ARC information is small, such as a single variable length ue(v) or fixed length codeword of a few bits, for example as shown above. Having the ARC information in a tile group header directly has the additional advantage of the ARC information may be applicable to a sub picture represented by, for example, that tile group, rather than the whole picture. See also below. In addition, even if the video compression technology or standard envisions only whole picture adaptive resolution changes (in contrast to, for example, tile group based adaptive resolution changes), putting the ARC information into the tile group header vis a vis putting it into an H.263-style picture header has certain advantages from an error resilience viewpoint.

In embodiments, for example the embodiment shown in FIG. 5D, the ARC information (512) itself may be present in an appropriate parameter set such as, for example, a picture parameter set, header parameter set, tile parameter set, adaptation parameter set, and so forth. FIG. 5D illustrates an embodiment in which adaptation parameter set (511) is used. The scope of that parameter set can advantageously be no larger than a picture, for example a tile group. The use of the ARC information is implicit through the activation of the relevant parameter set. For example, when a video coding technology or standard contemplates only picture-based ARC, then a picture parameter set or equivalent may be appropriate.

In embodiments, for example the embodiment shown in FIG. 5E, ARC reference information (513) may be present in a Tile Group header (514) or a similar data structure. That reference information (513) can refer to a subset of ARC information (515) available in a parameter set (516) with a scope beyond a single picture, for example a sequence parameter set, or decoder parameter set.

The additional level of indirection implied activation of a PPS from a tile group header, PPS, SPS, as used in JVET-M0135-v1 appears to be unnecessary, as picture parameter sets, just as sequence parameter sets, can (and have in certain standards such as RFC3984) be used for capability negotiation or announcements. If, however, the ARC information should be applicable to a sub picture represented, for example, by a tile groups also, a parameter set with an activation scope limited to a tile group, such as the Adaptation Parameter set or a Header Parameter Set may be the better choice. Also, if the ARC information is of more than negligible size—for example contains filter control information such as numerous filter coefficients—then a parameter may be a better choice than using a header (508) directly from a coding efficiency viewpoint, as those settings may be reusable by future pictures or sub-pictures by referencing the same parameter set.

When using the sequence parameter set or another higher parameter set with a scope spanning multiple pictures, certain considerations may apply:

1. The parameter set to store the ARC information table (516) can, in some cases, be the sequence parameter set, but in other cases advantageously the decoder parameter set. The decoder parameter set can have an activation scope of multiple CVSs, namely the coded video stream, i.e. all coded video bits from session start until session teardown. Such a scope may be more appropriate because possible ARC factors may be a decoder feature, possibly implemented in hardware, and hardware features tend not to change with any CVS (which in at least some entertainment systems is a Group of Pictures, one second or less in length). That said, putting the table into the sequence parameter set is expressly included in the placement options described herein, in particular in conjunction with point 2 below.

2. The ARC reference information (513) may advantageously be placed directly into the picture/slice tile/GOP/tile group header, for example tile group header (514) rather than into the picture parameter set as in JVCET-M0135-v1. For example, when an encoder wants to change a single value in a picture parameter set, such as for example the ARC reference information, then it has to create a new PPS and reference that new PPS. Assume that only the ARC reference information changes, but other information such as, for example, the quantization matrix information in the PPS stays. Such information can be of substantial size, and would need to be retransmitted to make the new PPS complete. As the ARC reference information (513) may be a single codeword, such as the index into the table and that would be the only value that changes, it would be cumbersome and wasteful to retransmit all the, for example, quantization matrix information. Insofar, can be considerably better from a coding efficiency viewpoint to avoid the indirection through the PPS, as proposed in JVET-M0135-v1. Similarly, putting the ARC reference information into the PPS has the additional disadvantage that the ARC information referenced by the ARC reference information (513) may apply to the whole picture and not to a sub-picture, as the scope of a picture parameter set activation is a picture.

In the same or another embodiment, the signaling of ARC parameters can follow a detailed example as outlined in FIGS. 6A-6B. FIGS. 6A-6B depict syntax diagrams in a type of representation using a notation which roughly follows C-style programming, as for example used in video coding standards since at least 1993. Lines in boldface indicate syntax elements present in the bitstream, lines without boldface often indicate control flow or the setting of variables.

As shown in FIG. 6A, a tile group header (601) as an exemplary syntax structure of a header applicable to a (possibly rectangular) part of a picture can conditionally contain, a variable length, Exp-Golomb coded syntax element dec_pic_size_idx (602) (depicted in boldface). The presence of this syntax element in the tile group header can be gated on the use of adaptive resolution (603)—here, the value of a flag not depicted in boldface, which means that flag is present in the bitstream at the point where it occurs in the syntax diagram. Whether or not adaptive resolution is in use for this picture or parts thereof can be signaled in any high level syntax structure inside or outside the bitstream. In the example shown, it is signaled in the sequence parameter set as outlined below.

Referring to FIG. 6B, shown is also an excerpt of a sequence parameter set (610). The first syntax element shown is adaptivepic resolution change flag (611). When true, that flag can indicate the use of adaptive resolution which, in turn may require certain control information. In the example, such control information is conditionally present based on the value of the flag based on the if( ) statement in the parameter set (612) and the tile group header (601).

When adaptive resolution is in use, in this example, coded is an output resolution in units of samples (613). The numeral 613 refers to both output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of those two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons, and are well known in the art.

In certain applications, it can be advisable that the encoder instructs the decoder to use a certain reference picture size rather than implicitly assume that size to be the output picture size. In this example, the syntax element reference_pic_size_present_flag (614) gates the conditional presence of reference picture dimensions (615) (again, the numeral refers to both width and height).

Finally, shown is a table of possible decoding picture width and heights. Such a table can be expressed, for example, by a table indication (num_dec_pic_size_in_luma_samples_minus1) (616). The "minus1" can refer to the interpretation of the value of that syntax element. For example, if the coded value is zero, one table entry is present. If the value is five, six table entries are present. For each "line" in the table, decoded picture width and height are then included in the syntax (617).

The table entries presented (617) can be indexed using the syntax element dec_pic_size_idx (602) in the tile group header, thereby allowing different decoded sizes—in effect, zoom factors—per tile group.

Certain video coding technologies or standards, for example VP9, support spatial scalability by implementing certain forms of reference picture resampling (signaled quite differently from the disclosed subject matter) in conjunction with temporal scalability, so to enable spatial scalability. In particular, certain reference pictures may be upsampled using ARC-style technologies to a higher resolution to form the base of a spatial enhancement layer. Those upsampled pictures could be refined, using normal prediction mechanisms at the high resolution, so to add detail.

Embodiments discussed herein can be used in such an environment. In certain cases, in the same or another embodiment, a value in the NAL unit header, for example the Temporal ID field, can be used to indicate not only the temporal but also the spatial layer. Doing so may have certain advantages for certain system designs; for example, existing Selected Forwarding Units (SFU) created and optimized for temporal layer selected forwarding based on the NAL unit header Temporal ID value can be used without modification, for scalable environments. In order to enable that, there may be a requirement for a mapping between the coded picture size and the temporal layer is indicated by the temporal ID field in the NAL unit header.

In HEVC, instantaneous decoding refresh (IDR) and clean random access (CRA) pictures are used as random access point technologies. The CRA picture can, in certain cases, have a better coding efficiency than an IDR picture, by enabling an open group of picture (GOP) structure which can allow a following picture to reference a leading picture for motion compensated prediction. However, any existing random access picture types, including IDR and CRA may be coded as a intra coded picture (I-picture). Therefore, inserting an unnecessary random access picture may harm coding efficiency. In embodiments, a layered random access (LRA) picture can provide better coding efficiency through a flexible prediction structure with adaptive resolution change and reference picture resampling.

An access unit (AU) supporting LRA may include two (or more) coded pictures, including at least a base layer picture and one or more enhancement layer picture(s). The description below relates to an example including one base layer picture and one enhancement layer picture sharing the same AU, but the disclosure is not limited thereto, and can be readily extended to more than one enhancement layer. The spatial resolution of the base layer picture may be lower than or equal to the spatial resolution of the enhancement layer picture. The base layer picture may be coded as an I-picture, while the enhancement layer picture may be coded as P-/B-picture, which may reference the decoded picture(s) stored in the decoded picture buffer, including the (timely) previous picture(s) (in another AU) and the base layer picture (in the same AU).

In embodiments, the bitrate of the base layer picture in the LRA AU may be lower than the bitrate of the IDR/CRA picture, because the LRA base layer picture may be coded in low spatial resolution or using a numerically high quantization parameter. The bitrate of the LRA enhancement layer picture may also be lower than the bitrate of the IDR/CRA picture, because the LRA enhancement layer picture may be coded as P-/B-picture by referencing the previous picture or the LRA base layer picture for motion compensated prediction and motion vector prediction. In embodiments, the total bitrate of the LRA base layer picture and the LRA enhancement layer picture may be lower than the bitrate of the single IDR/CRA picture.

In embodiments, when the random access may occur at the LRA picture, the LRA enhancement layer picture may not be correctly decodable, because the LRA enhancement layer picture has decoding dependency from the previous picture(s) and those pictures may not be in the reference picture buffer because of the random access. In this case, however, the decoded LRA base layer picture may be re-sampled or filtered, and may replace the decoded LRA enhancement layer picture. The LRA base layer picture may be correctly decoded because the LRA base layer picture according to above assumptions coded as I-picture without any inter-picture dependency. In this case, a certain drift between the decoded LRA base layer picture and the decoded LRA enhancement layer picture may appear in the current decoded picture, and may propagate to the following decoded picture(s). The drift may be cleaned up through one or more of the many drift-control techniques known to a person skilled in the art, including, for example intra macroblock walk-around.

In the same or another embodiment, drift control can include a sensible mix of IDR/CRA enhancement layer pictures (eliminating drift, at the expense of coding efficiency) and LR enhancement layer pictures (potentially incurring drift, but beneficial to coding efficiency).

In the same or another embodiment, when a following picture accesses and uses a LRA enhancement layer picture for inter-prediction, the decoded pixel data may be used for motion compensated prediction, while any metadata or motion vector may not be used for inter-prediction, in order to disallow a critical error propagation caused by mismatch of metadata or motion vector.

Figure 8:
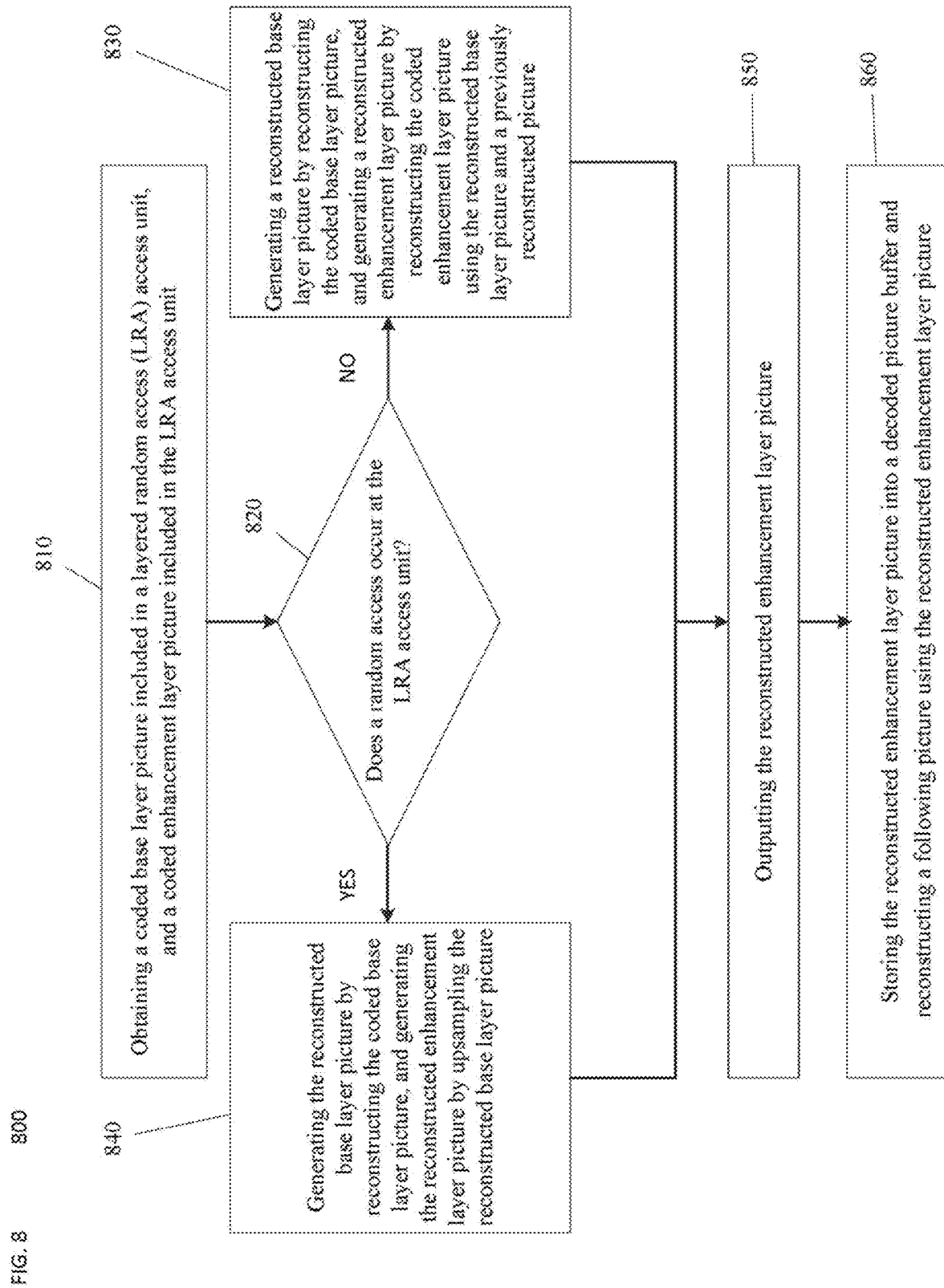
FIG. 8 is a flowchart of an example process for decoding an encoded video bitstream in accordance with an embodiment.

FIG. 8 shows an example of the prediction structure with an LRA picture, with POC equal to k. When a random access does not occur at the LRA picture (Case 0), the LRA base layer picture may be decoded and the LRA enhancement layer picture may be decoded, sequentially. In this case, the previous picture(s) (for example POC K−1) may be decoded and stored in the DPB. The LRA enhancement layer picture may be correctly decoded and used a reference picture for motion compensated prediction of the following picture(s) with POC K+1, POC K+2 . . . and so on. When a random access occurs at the LRA picture (Case 1), the LRA enhancement layer picture may not be correctly decoded, due to absence of the previous picture(s) in the DPB. In this case, the LRA base layer picture may be up-sampled and replaces the LRA enhancement layer picture. The up-sampled (decoded) LRA based layer picture may be stored in the DPB, with POC K, and used as a reference picture for motion compensated prediction of the following picture(s).

FIG. 8 is a flowchart is an example process 800 for decoding an encoded video bitstream. In some implementations, one or more process blocks of FIG. 8 may be performed by decoder 210. In some implementations, one or more process blocks of FIG. 8 may be performed by another device or a group of devices separate from or including decoder 210, such as encoder 203.

As shown in FIG. 8, process 800 may include obtaining from the encoded video bitstream a coded base layer picture included in a layered random access (LRA) access unit, and a coded enhancement layer picture included in the LRA access unit (block 810).

As further shown in FIG. 8, process 800 may include determining whether a random access occurs at the LRA access unit (block 820).

As further shown in FIG. 8, if a random access is determined not to occur at the LRA access unit (NO at block 820), process 800 may include generating a reconstructed base layer picture by reconstructing the coded base layer picture, and generating a reconstructed enhancement layer picture by reconstructing the coded enhancement layer picture using the reconstructed base layer picture and a previously reconstructed picture (block 830).

As further shown in FIG. 8, if a random access is determined not to occur at the LRA access unit (NO at block 820), process 800 may include generating the reconstructed base layer picture by reconstructing the coded base layer picture, and generating the reconstructed enhancement layer picture by upsampling the reconstructed base layer picture (block 840).

As further shown in FIG. 8, process 800 may include outputting the reconstructed enhancement layer picture (block 850).

As further shown in FIG. 8, process 800 may include storing the reconstructed enhancement layer picture into a decoded picture buffer; and reconstructing a following picture using the reconstructed enhancement layer picture (block 860).

In an embodiment, based on the random access occurring at the LRA access unit, the previously reconstructed picture is unavailable In an embodiment, the coded base layer picture may have a first picture type, and the coded enhancement layer picture may have a second picture type different from the first picture type.

In an embodiment, the first picture type may be an intra-coded picture type, and the second picture type may be one from among a predicted picture type and a bidirectional predicted picture type.

In an embodiment, the first picture type may be one from among an instantaneous decoder refresh picture type and a clean random access picture type.

In an embodiment, the reconstructed base layer picture may be upsampled using an adaptive resolution change (ARC) process.

In an embodiment, ARC parameters used in the ARC process may be signaled in one from among a slice header, a group of pictures header, a tile header, and a tile group header.

In an embodiment, ARC parameters used in the ARC process may be signaled in one from among a picture parameter set, a header parameter set, a tile parameter set, and an adaptation parameter set.

In an embodiment, ARC parameters used in the ARC process may be signaled in a tile group header.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
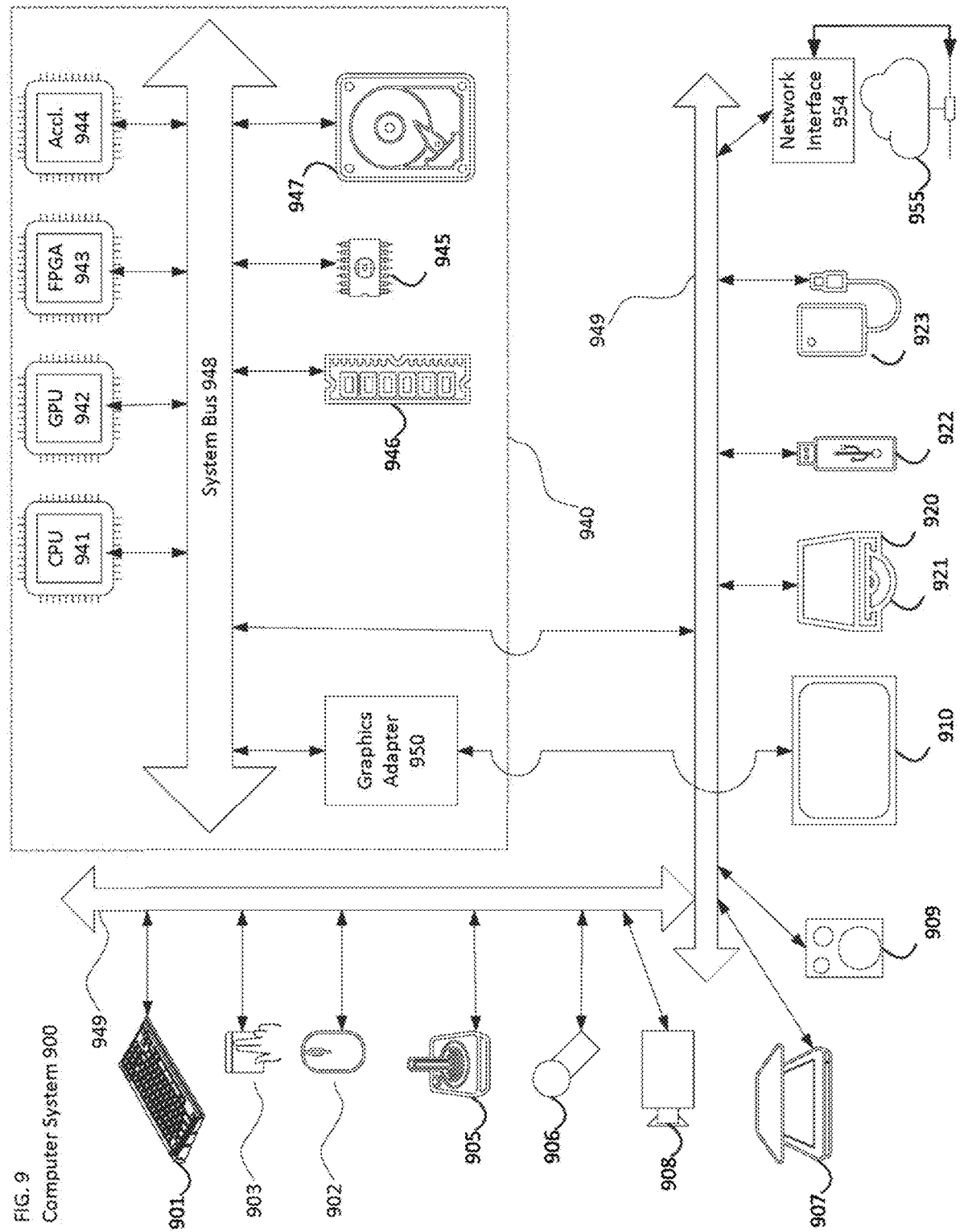
FIG. 9 is a schematic illustration of a computer system in accordance with an embodiment.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910 and associated graphics adapter 950, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface(s) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (954) that attached to certain general purpose data ports or peripheral buses (949) (such as, for example universal serial bus (USB) ports of the computer system 900; others are commonly integrated into the core of the computer system 900 by attachment to a system bus as described below (for example Ethernet interface into a PC computer system or cellular network interface into a smartphone computer system). As an example, network 955 may be connected to peripheral bus 949 using network interface 954. Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (954) as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory (RAM) 946, internal mass storage such as internal non-user accessible hard drives, solid-state drives (SSDs), and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of decoding an encoded video bitstream using at least one processor, the method comprising:
   obtaining from the encoded video bitstream a coded base layer picture included in a layered random access (LRA) access unit, and a coded enhancement layer picture included in the LRA access unit;
   determining whether a random access occurs at the LRA access unit;
   based on the random access not occurring at the LRA access unit, generating a reconstructed base layer picture by reconstructing the coded base layer picture, and generating a reconstructed enhancement layer picture by reconstructing the coded enhancement layer picture using the reconstructed base layer picture and a previously reconstructed picture;
   based on the random access occurring at the LRA access unit:
      generating the reconstructed base layer picture by reconstructing the coded base layer picture, and
      based on the coded enhancement layer picture depending on the previously reconstructed picture and the previously reconstructed picture being unavailable, generating the reconstructed enhancement layer picture based on a reference picture generated by upsampling the reconstructed base layer picture; and
   outputting the reconstructed enhancement layer picture.

2. The method of claim 1, wherein the reference picture is generated by filling virtual data, or filtering the reconstructed base layer picture.

3. The method of claim 1, further comprising:
   storing the reconstructed enhancement layer picture into a decoded picture buffer; and
   reconstructing a following picture using the reconstructed enhancement layer picture.

4. The method of claim 1, wherein the coded base layer picture has a first picture type, and
   wherein the coded enhancement layer picture has a second picture type different from the first picture type.

5. The method of claim 4, wherein the first picture type is an intra-coded picture type, and
   wherein the second picture type is one from among a predicted picture type and a bidirectional predicted picture type.

6. The method of claim 5, wherein the first picture type is one from among an instantaneous decoder refresh picture type and a clean random access picture type.

7. The method of claim 1, wherein the reconstructed base layer picture is upsampled using an adaptive resolution change (ARC) process.

8. The method of claim 7, wherein ARC parameters used in the ARC process are signaled in one from among a slice header, a group of pictures header, a tile header, and a tile group header.

9. The method of claim 7, wherein ARC parameters used in the ARC process are signaled in one from among a picture parameter set, a header parameter set, a tile parameter set, and an adaptation parameter set.

10. The method of claim 7, wherein ARC parameters used in the ARC process are signaled in a tile group header.

11. A device for decoding an encoded video bitstream, the device comprising:
    at least one memory configured to store program code; and
    at least one processor configured to read the program code and operate as instructed by the program code, the program code including:
       first obtaining code configured to cause the at least one processor to obtain from the encoded video bitstream a coded base layer picture included in a layered random access (LRA) access unit, and a coded enhancement layer picture included in the LRA access unit;
       determining code configured to cause the at least one processor to determine whether a random access occurs at the LRA access unit;
       first generating code configured to cause the at least one processor to, based on the random access not occurring at the LRA access unit, generate a reconstructed base layer picture by reconstructing the coded base layer picture, and generate a reconstructed enhancement layer picture by reconstructing the coded enhancement layer picture using the reconstructed base layer picture and the previously reconstructed picture;
       second generating code configured to cause the at least one processor to, based on the random access occurring at the LRA access unit:
          generate the reconstructed base layer picture by reconstructing the coded base layer picture, and
          based on the coded enhancement layer picture depending on the previously reconstructed picture and the previously reconstructed picture being unavailable, generate the reconstructed enhancement layer picture by upsampling the reconstructed base layer picture; and
       output code configured to cause the at least one processor to output the reconstructed enhancement layer picture.

12. The device of claim 11, wherein the program code further comprises:
    storing code configured to cause the at least one processor to store the reconstructed enhancement layer picture into a decoded picture buffer; and
    reconstructing code configured to cause the at least one processor to reconstruct a following picture using the reconstructed enhancement layer picture.

13. The device of claim 11, wherein the coded base layer picture has a first picture type, and
    wherein the coded enhancement layer picture has a second picture type different from the first picture type.

14. The device of claim 13, wherein the first picture type is an intra-coded picture type, and
wherein the second picture type is one from among a predicted picture type and a bidirectional predicted picture type.

15. The device of claim 11, wherein the reconstructed base layer picture is upsampled using an adaptive resolution change (ARC) process.

16. The device of claim 15, wherein ARC parameters used in the ARC process are signaled in one from among a slice header, a group of pictures header, a tile header, and a tile group header.

17. The device of claim 15, wherein ARC parameters used in the ARC process are signaled in one from among a picture parameter set, a header parameter set, a tile parameter set, and an adaptation parameter set.

18. The device of claim 15, wherein ARC parameters used in the ARC process are signaled in a tile group header.

19. A non-transitory computer-readable medium storing instructions, the instructions comprising: one or more instructions that, when executed by one or more processors of a device for decoding an encoded video bitstream, cause the one or more processors to:
obtain from the encoded video bitstream a coded base layer picture included in a layered random access (LRA) access unit, and a coded enhancement layer picture included in the LRA access unit, wherein the coded enhancement layer picture depends on a previously reconstructed picture;
determine whether a random access occurs at the LRA access unit;
based on the random access not occurring at the LRA access unit, generate a reconstructed base layer picture by reconstructing the coded base layer picture, and generate a reconstructed enhancement layer picture by reconstructing the coded enhancement layer picture using the reconstructed base layer picture and the previously reconstructed picture;
based on the random access occurring at the LRA access unit:
generate the reconstructed base layer picture by reconstructing the coded base layer picture, and
based on the coded enhancement layer picture depending on the previously reconstructed picture and the previously reconstructed picture being unavailable, generate the reconstructed enhancement layer picture by upsampling the reconstructed base layer picture; and
output the reconstructed enhancement layer picture.

* * * * *